Figure 1:
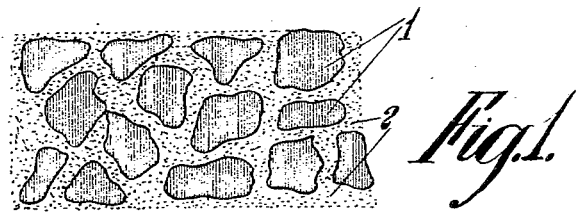

Inventors
E. M. O'C. Honey
C. R. Hardy

United States Patent Office

2,810,932
PROCESS FOR PRODUCTION OF DIAPHRAGMS FOR USE IN ION EXCHANGE PROCESSES

Eric Maurice O'Conor Honey and Charles Rupert Hardy, Dagenham Dock, England, assignors to The Chloride Electrical Storage Company Limited, Clifton Junction, near Manchester, England Application April 30, 1954, Serial No. 426,912

Claims priority, application Great Britain May 18, 1953

6 Claims. (Cl. 18—47.5)

In electrolytic processes, such as the electrolysis of a solution of sodium sulphate, the ions are attracted to the appropriate electrode, with the eventual result that a solution of sodium hydroxide collects around the cathode and a solution of sulphuric acid collects around the anode. In the absence of diaphragms, these substances will tend to move by convection and diffusion and so recombine. This tendency can be overcome, to some extent, at least, by enclosing the electrodes in suitable diaphragms. Even then some diffusion will occur.

It is an object of this invention to provide diaphragms for electrolysis which will prevent any undesired backward movement of ions or molecules.

In accordance with our present invention we incorporate in a thermoplastic polymer, such as polyvinyl chloride, fine granules of an ion-exchange resin with the aid of a suitable solvent for the thermoplastic polymer which assists in the mixing and dispersion of the ion-exchange resin and produces a dough which can be extruded or otherwise shaped to a desired form for a diaphragm, after which the solvent is removed by evaporation. For the purpose of increasing the viscosity of the dough and improving its mixing and handling properties, the solvent may be partly replaced by a liquid which is not a solvent for the thermoplastic polymer, but is compatible with the solvent and is removable by evaporation.

There may be mechanical working of the diaphragm after the partial or complete removal of the solvent and other liquid if present, for instance by calendering to a reduced thickness, for the purpose of bringing the particles of ion-exchange resin into better contact with one another, so improving the permeability of the diaphragm to ions.

The use of a solvent for the thermoplastic polymer is essential because it makes possible the incorporation of a large proportion of ion-exchange resin in the diaphragm. The thermoplastic polymer is temporarily plasticised by the solvent, forming a gel which is readily deformed in the mixing operation and is thereby enabled to take up a large amount of ion-exchange resin. The finished diaphragm may be made to contain over 85% of ion-exchange resin by this process, giving it high ionic permeability and reducing its cost of manufacture by the easy processing conditions and by the small proportion of non-ionically active thermoplastic polymer present in the finished diaphragm.

Polyvinyl chloride is particularly advantageous for the manufacture of ion-exchange resin diaphragms, because of its easy processing characteristics and its extreme chemical resistance. Other thermoplastic polymers possess these desirable characteristics in varying degrees and are adaptable to the process. For instance, those co-polymers of vinyl chloride with vinyl acetate or vinylidene chloride in which the vinyl chloride is not less than 84% can be satisfactorily employed with some loss of chemical resistance, but with a gain in ease of processing and of flexibility of the finished diaphragm. Increased flexibility may be also obtained by adding a plasticiser, preferably of the non-migratory type such as polypropylene sebacate, to the mixture from which the dough is produced, for instance in a proportion of one part plasticiser to two parts polyvinyl chloride.

Polyethylene can be satisfactorily used in the manufacture of ion-exchange resin diaphragms, where its extreme chemical resistance is advantageous. The processes of mixing and extruding are preferably carried out at temperatures in excess of 80° C., as below that temperature polyethylene ceases to be soluble.

The use of diaphragms as described herein is not necessarily confined to electrolysers. They may be used to take the place of beds of granulated ion exchange resins in the treatment of aqueous liquids by ion exchange without electrolysis. For this purpose, the diaphragms may be ribbed or embossed to space them apart from one another in a suitable pack. As such treatment of aqueous liquids will depend upon liquid transfer to bring the ions in solution into contact with the ion exchange resin, diaphragms intended for this use may be given liquid permeability by adding a leachable ingredient to the dough during mixing and removing it after the evaporation of the solvent.

As an example of the application of our process to the manufacture of a permselective diaphragm containing a cation exchange resin, 10 parts by weight of polyvinyl chloride are mixed with 60 parts of a cation exchange resin of the phenolic type containing nuclear sulphonic hydroxyl groups, together with 26 parts of dimethyl cyclohexanone, the function of which is to soften the polyvinyl chloride in such a way that the cation exchange resin can be intimately mixed and dispersed through the polyvinyl chloride. Preferably the cation exchange resin should first be ground to pass to 140-mesh screen, producing for instance a particle size range of 0.005 to 0.150 millimetre diameter and then dried at 60° C. for about 50 hours. The mixing of the three ingredients is carried out in a dough-mixer at 100° C. for 2 hours to produce a plastic dough which is then extruded as a sheet 2 millimetres thick. The extruded sheet may at once be calendered to a thickness of 0.5 millimetre, a suitable thickness for the finished diaphragm, and the solvent then removed by evaporation in an oven at 100° C. for one hour. Immersed in a 0.1 N sodium chloride solution, this diaphragm has a specific conductance of 0.003 mho and the transport number (measured by E. M. F. methods) of the sodium ion is 0.9.

Alternatively, at least part of the calendering operation may be carried out after the solvent has been wholly or partially removed, then the 2 millimetre thick extruded strip may be at once calendered to a thickness of 1.25 millimetre and the solvent then removed by evaporation in an oven at 100° C. for 2 hours, followed by a final calendering operation to a thickness of 0.5 millimetre. Such a diaphragm, immersed in a 0.1 N sodium chloride solution has a specific conductance of 0.006 and a transport number of 0.9.

The removal of the solvent before the final calendering stage greatly increases the specific conductance while not affecting the permselectivity. It is to be assumed that the decreased plasticity of the polyvinyl chloride consequent upon the removal of the solvent causes it to tear more readily, so that the amount of mechanical work done in the calendering operation is increased. As a consequence, the particles of ion exchange resin may be assumed to be brought into better contact one with another, so increasing the specific conductance of the diaphragm. When the solvent remains until the final thickness is reached, the plasticity of the polyvinyl chloride is such that it tends to remain an encapsulating medium or lubricant between the ion exchange resin particles.

As an example of the application of our process to the manufacture of a permselective diaphragm containing an anion exchange resin, 10 parts by weight of polyvinyl chloride are mixed with 60 parts of a weakly basic anion exchange resin of the phenolic type containing amino and phenolic hydroxyl groups, together with 16 parts of dimethyl cyclohexanone and 4 parts of "White Spirit," being a predominately aliphatic hydrocarbon mixture, with, for instance, a boiling range of 150°–198° C. The anion exchange resin is previously ground to pass a 140 mesh screen and dried. After 2 hours mixing at 100° C. the dough is extruded as a sheet 2 millimetres thick. The extruded sheet may at once be calendered to a thickness of 0.5 millimetre and the solvent then removed by evaporation in an oven at 100° C. for 1 hour. The specific conductance of a diaphragm made in this way is about 0.001 mho in a 0.1 N sodium chloride solution.

Alternatively, the 2 millimetres extruded sheet may at once be calendered to a thickness of 1.25 millimetres and the solvent then removed by evaporation in an oven at 100° C. for 2-hours, followed by a final calendering operation to a thickness of 0.5 millimetre. The specific conductance of such a diaphragm is about 0.006 mho in a 0.1 N solution of sodium chloride. The use of a mixture of a solvent for the polyvinyl chloride and a non-solvent for it, that is to say, a mixture of dimethyl cyclohexanone and white spirit, alters the physical characteristics of the dough produced in the mixing operation. The presence of the white spirit causes the polyvinyl chloride/solvent mixture to form a much stiffer gel. Consequently the dough has greater strength, which is advantageous during manufacture. The polyvinyl chloride/solvent gel tends to encapsulate the ion exchange resin particles to a greater extent when a proportion of non-solvent is present. As a consequence, the specific conductance tends to be rather low if the diaphragm is brought to its final thickness dimension before the removal of the solvent and non-solvent by evaporation.

If it is desired that the diaphragm shall have a degree of flexibility and extensibility, a plasticiser may be added to the mixture. Preferably, the plasticiser should be chemically resistant and non-migratory, for instance, polypropylene sebacate. A mixture of 10 parts polyvinyl chloride, 5 parts polypropylene sebacate, 60 parts powdered ion exchange resin and 23 parts of dimethyl cyclohexanone is extruded at a temperature of 100° C. as a sheet 2 millimetres thick and immediately reduced to 1 millimetre by calendering. The solvent is then removed and the thickness is further reduced to 0.5 millimetre. The resulting diaphragm has a degree of flexibility which is advantageous when it is required to be adapted to complicated shapes.

Alternatively, a co-polymer having internal plasticisation may be employed, as in the following mixture: 10 parts of a co-polymer of vinyl chloride and vinyl acetate containing at least 84% of vinyl chloride is mixed with 60 parts of powdered ion exchange resin and 26 parts of butyl acetate at 100° C. for 2-hours. The dough is then extruded and treated as before. The use of the co-polymer in place of polyvinyl chloride gives easier mixing conditions and confers upon the finished diaphragm some increased flexibility.

As an example of the application of our process to polyethylene, 10 parts of this thermoplastic polymer is mixed with 40 parts of powdered ion exchange resin and 14 parts of xylene at 100° C. The dough is extruded and immediately calendered to a thickness of 1 millimetre, whereupon the solvent is removed by evaporation. The sheet is then calendered at a temperature of 100° C. to a thickness of 0.5 millimetre. The polyethylene diaphragm has the advantage of extreme chemical resistance.

We have shown that a number of thermoplastic polymers are adaptable to our process, providing that a suitable volatile solvent is available to form a gel which, in turn, has sufficient plasticity when mixed with powdered ion exchange resin to form a workable dough. Diaphragms may then be shaped from the dough by conventional means, such as extrusion, sheeting or calendering. The removal of the solvent at some stage in the process leaves behind an intimate mixture of thermoplastic polymer and ion exchange resin, the characteristics of the mixture being significantly influenced by the early or late removal of the solvent. By our process, which obviously is not necessarily limited in its application to the examples we have given, it is possible to obtain diaphragms of very high specific conductance, not obtainable with diaphragms made by other processes. The use of a solvent to soften the thermoplastic polymer permits a very high loading with ion exchange resin. Without the solvent, mixing is much more difficult and is limited to a comparatively low proportion of ion exchange resin. The high loading of ion exchange resin brought about by the use of a solvent for the thermoplastic polymer, coupled with the application of mechanical working after the removal of the solvent, is responsible for the high specific conductance already referred to.

Instead of calendering the material, after the removal of the solvent, to obtain the degree of mechanical working required to bring the particles of ion exchange resin into contact, the material may be given other forms of mechanical working after the removal of the solvent, for instance, by the application of stretching forces, whereby the material is elongated, say 10% while at a raised temperature. For instance, a mixture of polyvinyl chloride, ion exchange resin and dimethyl cyclohexanone is sheeted to a thickness of 0.5 millimetre. The solvent is then removed at a temperature of 100° C., whereupon the sheet, while still at that temperature, is elongated 10% in one direction. As a result of this stretching treatment, the specific conductance of the diaphragm is is improved.

Ion exchange resins are commonly used under conditions of liquid diffusion, whereby aqueous liquids are brought into contact with a "bed" of powdered ion exchange resin in a vessel through which the liquid is passing. In order that the ion exchange resin should deal efficiently with the appropriate ions present in the aqueous liquid, it is important that the ion exchange resin shall be in the form of small beads in a column of some length. This requirement involves high resistance to liquid flow, resulting in a low throughput.

By a suitable modification of our process we can provide diaphragms through which liquids may diffuse while coming into contact with ion exchange resins residing therein. For example, we may add a leachable, pore-forming ingredient to the mixture of ion exchange resin, thermoplastic polymer and solvent and after shaping the diaphragm, we remove the solvent and then remove the leachable ingredient. The finished diaphragm has pores through which liquids may diffuse. For instance, we mix 10 parts by weight of poly-vinyl chloride, 50 parts of a cation exchange resin in the sodium form, of particle size range 0.005–0.150 millimetre, 40 parts of sodium chloride of the same particle range and 30 parts of dimethyl cyclohexanone. After mixing for 2-hours at 100° C. the material is extruded as a sheet 2 millimetres thick. The extruded sheet is then calendered down to a thickness of 1 millimetre and the solvent removed. It is then calendered to 0.5 millimetre thick before leaching out the sodium chloride in water. As the ion exchange resin is incorporated in the diaphragm in its sodium form, a final treatment in hydrochloric acid is required to regenerate the resin before use. A diaphragm such as this provides for a high rate of liquid flow, while having high ion exchange efficiency due to the very small size of the beads of ion exchange resin.

Figure 2:
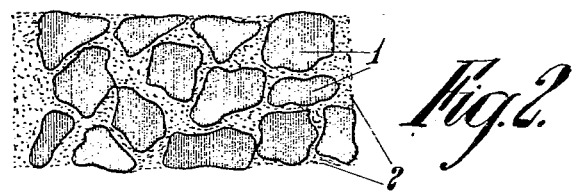
Figure 3:
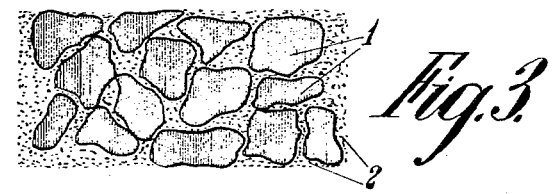

The accompanying diagrams, Figures 1–3 show three stages in the process according to the present invention.

In Figure 1, the particles 1 of ion exchange resin are embedded in a gel made by dissolving a thermoplastic polymer in a solvent for the polymer. In this form, the "dough" can be shaped to desired forms and then a substantial proportion of the solvent is removed by evaporation. In Figure 2, the gel 2 is diminished in volume, whereby the particles of ion-exchange resin 1 are brought closer together. According to experimental results, however, it would appear that the individual particles of ion-exchange resin 1 are not in as intimate contact with one another as would be desirable for the highest efficiency. Accordingly, after removing a substantial proportion of the solvent we calender the sheet to reduce its thickness as shown in Figure 3, so bringing into more intimate contact the particles of ion-exchange resin.

Figure 4:
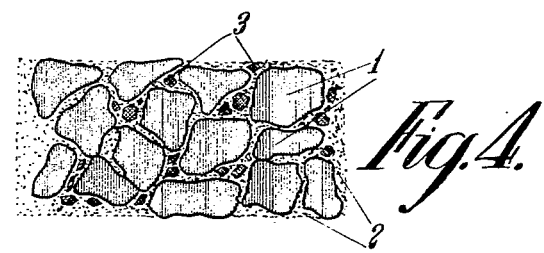

Figure 4 illustrates a modification of the process, showing the final form of diaphragm when, in addition to the other ingredients, a further ingredient 3 is incorporated. This is a leachable ingredient 3 and may consist of a water soluble salt which, after the completion of the main steps of the process, is then leached out by immersing the diaphragm in water.

We claim:

1. A process for the production of a diaphragm for use in electrolytic and ion exchange processes comprising gelling a thermoplastic polymer with the aid of a solvent therefor, incorporating and dispersing fine granules of an ion exchange resin in the gelled thermoplastic polymer, the weight of resin used being at least four times the weight of the thermoplastic polymer in the gel, shaping the mixture into sheets, removing a substantial proportion of the solvent by evaporation and reducing the thickness of the sheets by calendering so as to bring into intimate contact the granules of ion exchange resin and finally removing the remainder of the solvent.

2. A process as claimed in claim 1 in which the thickness of the sheets is reduced by stretching the sheets by about 10% in one direction at an elevated temperature whereat the thermoplastic polymer is brittle.

3. A process as claimed in claim 1 in which a liquid which is not a solvent for the thermoplastic polymer but is compatible with such solvent is added thereto and is removable with the solvent by evaporation.

4. A process as claimed in claim 1 in which the thermoplastic polymer is selected from the group consisting of polyvinyl chloride, polyethylene, a copolymer of vinyl chloride with vinyl acetate and a copolymer of vinyl chloride with vinylidene chloride.

5. A process as claimed in claim 1 incorporating in the mixture of a plasticiser for the thermoplastic polymer.

6. A process as claimed in claim 1 in which a leachable pore forming ingredient is added to the mixture of thermoplastic polymer, ion exchange resin and solvent, the leachable ingredient being removed after the solvent.

References Cited in the file of this patent

UNITED STATES PATENTS

| | | |
|---|---|---|
| 2,155,016 | Kershaw | Apr. 18, 1939 |
| 2,238,730 | Hauffe | Apr. 15, 1941 |
| 2,566,982 | Clemens et al. | Sept. 4, 1951 |
| 2,632,210 | Olson et al. | Mar. 24, 1953 |
| 2,681,319 | Bodamer | June 15, 1954 |
| 2,681,320 | Bodamer | June 15, 1954 |

FOREIGN PATENTS

| | | |
|---|---|---|
| 244,901 | Sweden | July 16, 1947 |